May 17, 1955
L. J. NOVAK
2,708,519
CHROMATOGRAPHIC ADSORPTION APPARATUS WITH
ELUTING SOLVENT FLOW CONTROL VALVE
Filed Jan. 30, 1953
2 Sheets-Sheet 1
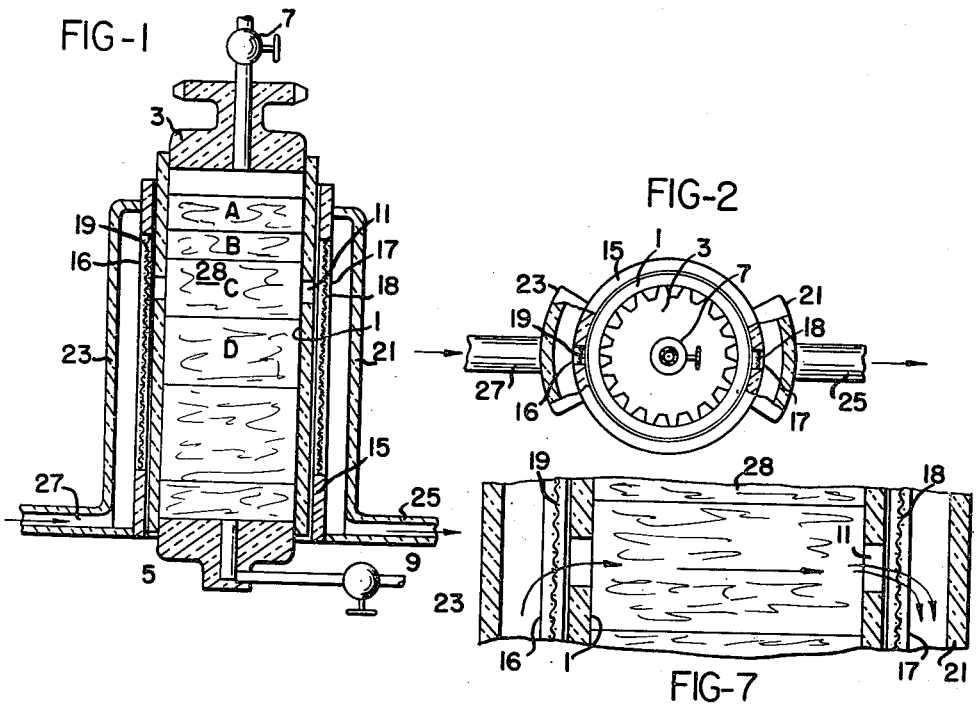
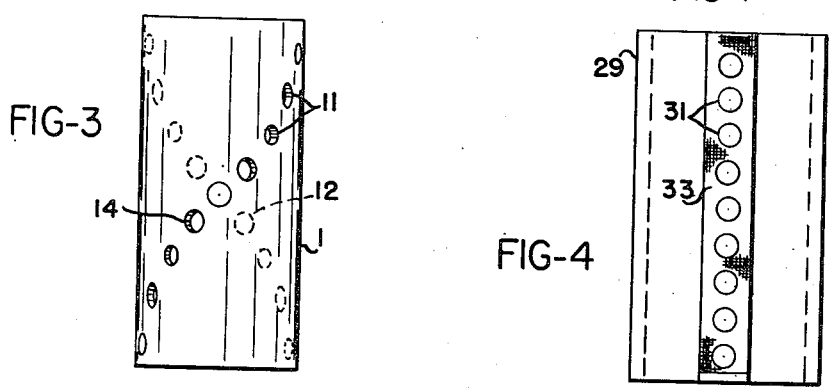
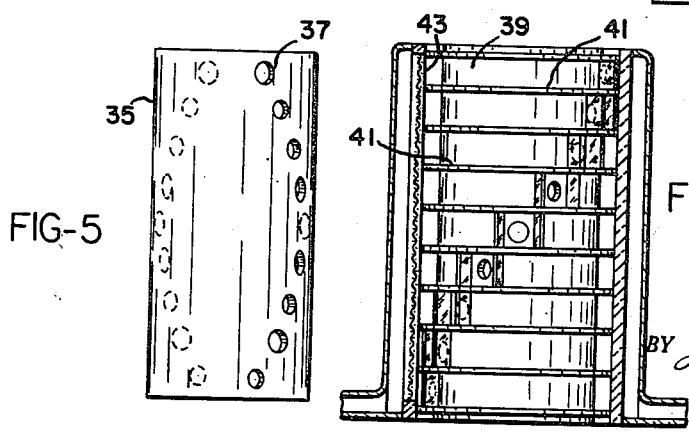
INVENTOR.
LEO J. NOVAK
ATTORNEYS May 17, 1955
L. J. NOVAK
2,708,519
CHROMATOGRAPHIC ADSORPTION APPARATUS WITH
ELUTING SOLVENT FLOW CONTROL VALVE
Filed Jan. 30, 1953
2 Sheets-Sheet 2
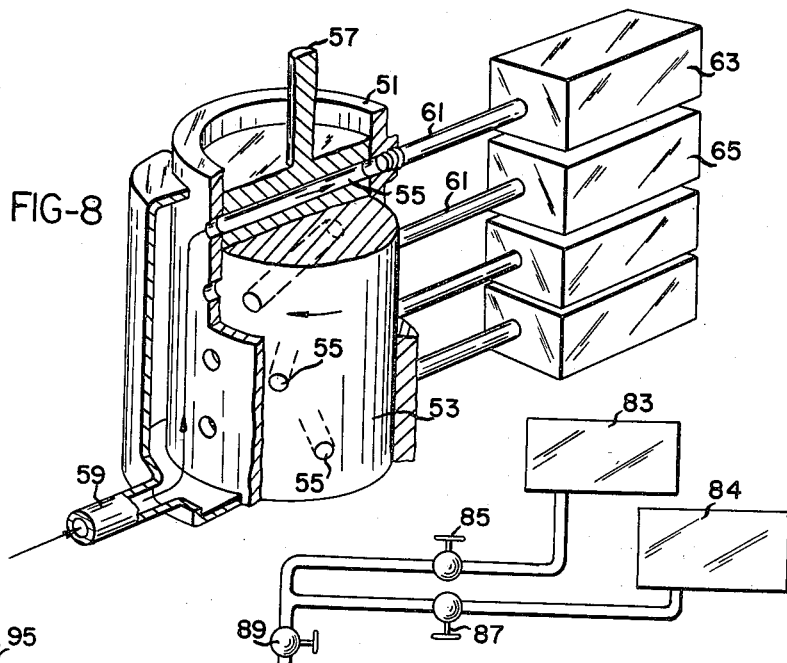
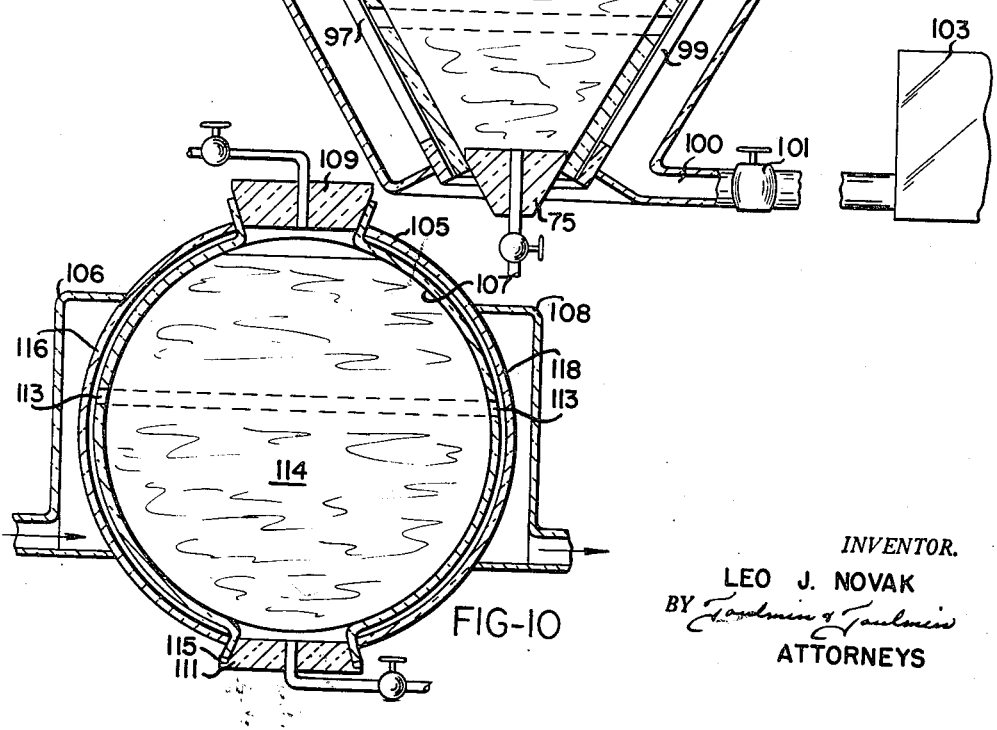
INVENTOR.
LEO J. NOVAK
BY
ATTORNEYS

United States Patent Office 2,708,519
Patented May 17, 1955

2,708,519

CHROMATOGRAPHIC ADSORPTION APPARATUS WITH ELUTING SOLVENT FLOW CONTROL VALVE

Leo J. Novak, Dayton, Ohio, assignor to The Commonwealth Engineering Company of Ohio, Dayton, Ohio, a corporation of Ohio Application January 30, 1953, Serial No. 334,339

8 Claims. (Cl. 210—42.5)

This invention relates to a structure for the control of fluid flow and particularly to an apparatus and method for use in chromatographic separation.

In chromatographic analysis and purification work it is customary to place adsorbents, such as magnesium oxide, within a tube and then to adsorb therein solutions of closely related complex chemical compounds which it is desired to analyze or purify. The effectiveness of the method is predicated upon the fact that the solutes will be selectively adsorbed at different rates resulting in a high concentration of a preferred solute at a particular location of the adsorbent within the tube—that is a band develops containing the solute in concentration in the adsorbent and this band may be isolated and thereafter the solute eluted from the adsorbent with a solvent for the solute. Since various solutes are adsorbed sequentially by an adsorbent the makeup of a particular chromatogram may be readily determined by reference to known standards. In many instances visual observation is sufficient to permit identification through inherent color effects, while in other instances a solvent which develops color may be employed to assist in identification.

It is desirable in such a process to be able to isolate the material of the adsorbed solute readily for identification, analysis or testing and this invention contemplates the provision of a process by which this may be readily achieved.

It is also within the contemplation of this invention to describe novel apparatus which may be effectively employed to isolate solute from a chromatogram.

It is further within the contemplation of the invention to describe a novel valve apparatus.

It is a principal object of the invention to describe apparatus for the isolation of a solute which apparatus does not require dismantling for effecting the isolation.

It is an important object of the invention to describe a system for the isolation of the adsorbed solute which system inhibits the entrance thereto of fluids other than those desired.

It is also an object of this invention to describe an adsorbing system which may be readily regenerated.

These and other allied objectives of this invention are attained by providing a valve apparatus having a pair of closely fitting, relatively movable bodies having circular mating peripheries, which bodies are positioned one within the other and having means which are selectively operable upon relative movement of the close-fitting bodies to pass a fluid transversely through the apparatus.

Preferably the close-fitting bodies are open end cylinders, the said open ends of which are adapted to be closed. The close-fitting bodies which must be rotatable one within the other may also take the form of cones, frustrums thereof or even, in special instances, spheres. Actually for the practice of the invention it is only necessary that the outer periphery of the inner body and the inner surface of the outer body provide mating structures which permit rotation of the bodies one within the other.

In the structure of invention each of the close-fitting bodies is provided with two sets of opposed openings and the openings of the outer body may be brought selectively into and out of coincidence with the openings of the inner body by simple rotation of one body within the other. The sets of openings are so arranged that as continuous rotation of one body with respect to the other takes place, a series of paths extending transversely through the apparatus are progressively opened and closed; this arrangement permits a path to be opened at any desired height of the apparatus while all other paths remain closed.

The structural arrangement described above is of particular value in chromatographic separations. Thus the inner body may be packed with an adsorbent material and the substances which it is desired to separate, analyze or identify may be fed thereto in solution form. Upon adsorption the usual bands or strata are formed and thereafter the substance of the desired band may be eluted from the adsorbent by simply passing a suitable solvent for the substance through the path or stratum containing the substance, it being necessary only to rotate the inner body with respect to the outer to open the path transversely through the apparatus.

The sharpness of the separation of the eluted substance is dependent of course upon the nature of the substance and the sharpness of the strata containing the same in the adsorbent. The sharpness may be controlled to some extent by the spacing of the openings of the inner body, close spacing permitting of narrower transverse paths. It is then possible to elute a single stratum at several levels of the same to assure of a substantially complete separation of the desired material.

In given instances, particularly purification processes, it may be desirable to employ several adsorbent structures, the material eluted from the first being adsorbed in a second, and then eluted therefrom, and so on, until the desired purity is attained. This procedure is effective since the adsorptive mechanism is dependent to some extent upon the concentrations of the substances fed thereinto and successive adsorptions may thus produce sharper strata for a desired material and consequently a more pure product.

The material of which the apparatus is constructed is not critical but it should of course have the necessary strength (not unusual strength) and inertness to the particular systems of solvents, solutes, liquids or gases which may be employed in the system.

Also, the bodies should be of such material and configuration that they will move easily one within the other, and for this purpose the bodies may be given a high polish if desired. Preferably glass such as Pyrex tubing is used as this material is transparent and in addition has the noted qualifications for most chromatographic purposes, but metal or plastics may also be employed when desired.

While particularly useful in chromatographic work the structure of invention in its various modifications finds application as a simple valve; thus where it is desirable to direct fluid from a single source or series of sources to a series of receivers the inner cylinder may be substantially solid but cored to permit fluid passage therethrough; the outer cylinder in such instance may be slotted or apertured as described hereinafter.

The invention will be more fully understood by reference to the following detailed description and accompanying drawings wherein:

Figure 1 is a sectional view in elevation illustrating one embodiment of the invention;

Figure 2 is a plan view of the structure of Figure 1;

Figure 3 is an elevational view of the inner body of Figure 1;

Figure 4 is an elevational view of an outer body which may be substituted for that of Figure 1;

Figure 5 is an elevational view of another embodiment of an inner body;

Figure 6 is an elevational view partly in section of yet another embodiment of the invention;

Figure 7 is an enlarged sectional view of a portion of Figure 1;

Figure 8 is an elevational view of a valve construction in accordance with the precepts of the invention;

Figure 9 illustrates a useful system for chromatographic work in which the bodies are in the form of frustums of cones; and Figure 10 illustrates spheres which are useful in the system of Figure 9.

Referring to the drawings there is shown at 1 in Figure 1 a glass cylinder stoppered at the ends by glass closures 3, 5 having petcocks 7, 9, respectively. The inner cylinder 1 is provided with openings 11 laterally thereinto, which openings form opposed spirals (Figure 3) over the outer periphery of the glass. The openings of each spiral as at 12 have a mating opening in the other spiral as at 14 to provide a path across the diameter of the cylinder.

Referring again to Figure 1, the cylinder 1 is enclosed within an outer cylinder 15 of glass which is provided with a pair of longitudinally extending ports 16, 17. Secured over port 17 is a housing 21 defining a passage 25 which leads outwardly from the port 17 while housing 23 defining a passage 27 leads into port 16 as indicated by the arrow. Screens 18 and 19 are provided respectively within ports 17 and 16.

Referring briefly to Figure 4 there is shown a cylinder 29 which is similar to cylinder 15 but is provided with two sets of vertically spaced ports 31 which ports define transverse paths across the diameter of the cylinder similarly to ports 16, 17. In this connection it is to be noted that where the apertures of the inner cylinder define spirals it is only necessary that the ports of the outer cylinder extend rectilineally, for reasons which will be illustrated hereinafter. The cylinder 1 as shown in Figure 1 is packed with an adsorbent material indicated at 28 which is sealed from the atmosphere by the closures 3, 5, respectively.

In the operation of the device, the cylinder 1 is rotatable with respect to the cylinder 15 and upon rotation the apertures 11 are progressively brought into coincidence with the ports 16, 17, thus defining successive transverse paths completely through the two cylinders.

Accordingly, when the adsorbent 28 has taken up complex chemical substances whose constituents it is desired to separate various concentrations of the compounds will be found to exist in strata of the adsorbent such as indicated at A, B, C, D and E. To elude a desired constituent it is merely necessary to rotate one cylinder with respect to the other until the apertures in the inner cylinder are coincident with the ports 16, 17, and to then pass an eluting solvent through passage 27 across the cylinders and out through passage 25 where the eluted material may be collected.

In the practice of the invention it is desirable when the solution of the complex substances is passed into the adsorbent to permit the solution to remain therein in order that a sharply defined path may be provided across the cylinder. While some tendency may exist for the eluting solvent to pass into the adjacent layers B and D this tendency is relatively minor, since low flow rates would normally be employed in such an apparatus and accordingly the substance eluted will be substantially pure. In given instances it may be necessary to achieve a desired result to pass the eluted material through a second adsorbent in the same manner, and such repetitive second adsorption and elution assures of the attainment of a pure material.

After the desired elution has been performed petcocks 7, 9 may be opened and solvents passed through the apparatus vertically to remove the remaining portion of the substance contained in the adsorbent and the column will then be ready again for reuse without removal of the adsorbent therefrom.

The screens 18, 19 which are provided within the ports 17, 16 and the screen 33 (Fig. 4) which is provided over the ports 31 are not necessary in all instances, but are precautionary measures to prevent the adsorbent from being passed through the system with the elution solution.

It is not necessary that the spiral formation of the apertures shown in Figure 3 be adhered to and Figure 5 illustrates another set of opposed apertures for the cylinder. Thus cylinder 35 is provided with two sets of apertures 37 and the opposed apertures of each set define a transverse path diametrically across the cylinder similarly as set out in connection with cylinder 1.

It is also not necessary to the invention that the rotatable body be perfect cylinders, for, as shown in Figure 6, the inner cylinder 39 may have flights 41 extending therefrom between the spirally spaced apertures, the flights having a circular periphery which engages the inner wall of the outer cylinder 43.

Figure 8 illustrates a valve member which in accordance with the precepts of the invention is adapted to pass liquid from a single source or a series of sources to a series of receivers. In this instance an outer steel cylinder 51 is provided with opposed ports extending rectilineally along the cylinder wall, the ports defining, as described hereinbefore, diametrical paths across the cylinder.

The solid internal cylinder 53 may be cored as at 55 to provide transverse passage therethrough, this inner cylinder being rotatable within the other cylinder by means indicated at 57. A single source 59 passes fluid through the port of the outer cylinder through the passageway 55 to the outlets 61 connected to the outer cylinder for reception in various receivers indicated at 63, 65, respectively.

It is to be noted that in order to perform the functions described in each of the modifications of the invention it is only necessary that the rotatable bodies be close fitting, that is sufficiently close fitting to inhibit the flow of fluid between the walls of the two cylinders.

In certain circumstances it may be desirable to provide over the walls of the cylinders a lubricant which would have no deleterious effect upon the material passing through the system. For example, when passing water, a thin coating of vaseline may exist between the two cylinders to insure of a fluid-tight rotatable relationship therebetween.

Referring again to Figure 1 there is set forth below two examples of the manner in which the device may be used for the separation of substances:

*Example I*

To start the operation the two cylinders are zeroed so that no transverse path is open; the inner cylinder may then be filled with powdered pure calcium carbonate, the lower end of the cylinder being closed by closure 5, the upper end of the cylinder being closed by closure 3 after the carbonate has been packed therein; petcock 7 is then opened and a carbonate solution of green leaf pigments is slowly passed into the adsorbent. A series of separate bands of adsorbent pigmented solutes consisting of chlorophyll *a*, chlorophyll *b*, and four xanthophylls, designated alpha, alpha prime, alpha double prime and beta, are observable. To remove the beta band, for example, from the adsorbent it is only necessary to rotate the cylinders relatively in order to bring the desired quartet of openings which define the transverse path containing the beta band into coincidence. A mixture of petroleum ether containing 1 to 10 percent of alcohol is then passed through passage 27 across the indicated path and out passage 25 for the eluted material to be readily collected. The flow of eluting solvent should preferably be very slow, not more than 6,000 cc. per hour.

*Example II*

In this instance the inner cylinder may be properly packed with starch although an ion exchange resin or a paper pulp may be readily substituted for the starch. A hydrolyzed filtered decolorized solution of casein is then passed through the open petcock to be adsorbed by the selected adsorbing material. Thereafter a small volume of ninhydrin developing solution is passed through the petcock 7; if desired during this passage of the ninhydrin the body may be relatively rotated very slowly and this mode of operation is particularly useful where it is desired to identify a particular layer without undue reaction with an ninhydrin. Thus just as the point is reached at which the color in a layer begins to develop the flow of ninhydrin may be stopped and the elution solvent passed through the layer without any substantial reaction with the ninhydrin having taken place. Accordingly the material eluted will be the desired material and not the reaction product of ninhydrin and the desired material.

Where, however, the material is not reacted with the ninhydrin in such a manner as to be detrimental to the analysis of separation, the petcock 7 may be closed after the ninhydrin has been supplied to the system; for example, in the present case the system may be closed and then normal butanol benzyl alcohol almost completely saturated with water supplied for the extraction of the desired material by passing the solvent through the port 16 across the desired layer and out the passage 25.

It is to be noted in connection with the foregoing that when the cylinders are rotated to bring a quartet of openings into coincidence to a path across the apparatus, it is not necessary that the openings register exactly with one another. On the contrary it is sometimes beneficial to control the flow of influent through the port 16 by rotating only into partial coincidence. The effectiveness of this method of limiting the flow is dependent of course upon the relative sizes of the openings in each of the cylinders and the spacings thereof.

The system of Figure 9 is suitable for extraction as set forth in the foregoing examples and is of particular value where a sharp line of demarkation is desired between the adsorbed solutes of the system.

The use of cones has the advantage that the quantity of adsorbent varies continuously over the length of the adsorbent, and accordingly in systems where one material is adsorbed much more quickly than another complete adsorption of one substance may take place in the upper or more voluminous portion of the cone while a separate material may exist substantially completely free of the other material in the lower portion of the cone. Accordingly in Figure 9 there is shown an intercone 71 of glass stoppered at 73, 75 and provided with an outer conical body 77 having housings 79, 81. A supply 83 of a solution containing the material to be adsorbed may be passed through valve 85 (valve 87 being closed) and through petcock 89 into the adsorbent. Valve 85 may then be closed and a developer of supply 84 passed through valves 87, 89 to the adsorbent.

During the passage of the developer the inner cone may be rotated very slowly with respect to the outer cone and as the action of the ninhydrin occurs the development of the desired color may indicate the point at which the feeding of the developing solution should be stopped in order to avoid contamination of the substance desired to be eluted.

The slow rotation of the cones will bring into coincidence the quartet of openings which will permit elution of the desired material, substantially no reaction between the ninhydrin and the desired material having taken place. Accordingly adsorbent 91 at the desired layer is supplied to the elution agent 93 through open valve 95 in line 96 to port 97, the eluted material passing out through port 99, passageway 100, valve 101 to receiver 103. Thereafter the petcock and closure member 75 may be opened and the system, if desired, drained of the material in the adsorbent and if necessary a solvent may be passed through the adsorbent through petcock 89 to effect the removal of the adsorbent. The system is accordingly then ready for another treatment.

Figure 10 illustrates components which may be substituted for the cones, etc. of Figure 9. In this Figure 10 a sphere 105 having housings 106, 108 surrounds an inner sphere 107 and stoppers 109, 111 pass through the spheres at opposite diameters thereof. The inner sphere is centrally provided with adsorbent material 114 and with opposed spiraled openings 113. The outer sphere is provided over the surface thereof with opposed rectilineal slots 116, 118.

It is to be noted that in this mode of operation the stopper 111 serves as a fluid seal and may if desired be provided with gaskets as indicated at 115 for this purpose.

In connection with the use of spheres it is to be seen that a very large number of openings may be employed as desired in each of the bodies and that the system in employing spheres has a somewhat greater degree of flexibility in this respect than a similar system employing cones or cylinders.

It is also to be noted that if desired more than two sets of opposed openings may be used in each of the spheres.

It will be understood that this invention is susceptible to modification in order to adopt it to different usages and conditions and accordingly, it is desired to comprehend such modifications within this invention as may fall within the scope of the appended claims.

I claim:

1. In a system for chromatographic separation of materials, said apparatus comprising, a pair of close-fitting hollow bodies rotatable one within the other, each body having openings selectively registrable with openings of the other body to define paths through the bodies normal to the axis of rotation, an adsorbent for a solute filling the inner body, and means to pass an eluting solvent for said solute through a selected path of said bodies, and means for passing material to be separated by adsorption axially of the apparatus.

2. In a system for chromatographic separation of materials, said apparatus comprising, a pair of close-fitting hollow cylinders rotatable one within the other, each cylinder having openings selectively registrable with openings of the other cylinder to define paths through the cylinders normal to the axis of rotation, an adsorbent for a solute filling the inner cylinder, and means to pass an eluting solvent for said solute through a selected path of said cylinders, and means for passing material to be separated by adsorption axially of the apparatus.

3. Apparatus for fluid control in chromatographic separation of materials, said apparatus including relatively rotatable members and comprising, an outer cylinder member the inner cross section of which is circular, and an inner cylinder member of lesser diameter than the inner diameter of the outer member, the inner member having flights thereon of a diameter corresponding to the inner diameter of the outer cylinder member, said flights comprising extensions having a circular periphery which engages the inner wall of the outer cylinder the outer member having opposed ports extending rectilineally therealong with respect to the major axis thereof, and the inner cylinder having diametrically opposed sets of apertures spirally disposed with respect ot the axis thereof, the ports of said outer cylinder being selectively registrable with the apertures of said inner cylinder for passage of fluid in selected transverse paths through said cylinder, and means for passing material to be separated by adsorption axially of the apparatus.

4. Apparatus for fluid control in chromatographic separation of materials, said apparatus comprising a pair of close-fitting relatively rotatable cylinders having circular mating peripheries one within the other, the inner body having two sets of opposed apertures laterally thereinto, the apertures of each set of the inner body being disposed arcuately, and the outer of the bodies having diametrically opposed ports extending of its mating periphery, the apertures of the inner body being constructed and arranged to provide a pair of paths through said body normal to the axis of rotation upon relative movement of the bodies, and means for passing material to be separated by adsorption axially of the apparatus.

5. Apparatus for fluid flow control in chromatographic separation of materials, said apparatus comprising a pair of close-fitting, relatively rotatable concentrically arranged bodies having circular mating peripheries one within the other, the outer of which bodies has diametrically opposed ports extending through its mating periphery and the inner of which bodies has apertures cooperable upon said relative rotation for passage of a fluid normal to the axis of rotation through said bodies, said ports each having a housing thereover defining a passage leading to a port, and means for passing material to be separated by adsorption axially of the apparatus.

6. Apparatus for fluid flow control in chromatographic separation of materials, said apparatus comprising a pair of close fitting, relatively rotatable bodies having circular mating peripheries one within the other, and each having opposed openings laterally thereinto, the openings of the outer body having diametrically opposed ports extending rectilineally along its mating periphery and the openings of the inner body having apertures which are registrable with said ports upon said relative movement for the passage of fluid in paths through said bodies normal to the axis of rotation, said ports each having a housing thereover defining a passage leading to the port, and means for passing material to be separated by adsorption axially of the apparatus.

7. Apparatus for fluid flow control in chromatographic separation of materials, said apparatus comprising a pair of close-fitting, relatively rotatable bodies having circular mating peripheries one within the other, and the inner body having two sets of opposed apertures laterally thereinto, the apertures of each set of said inner body being spirally disposed along the body, and the outer body having diametrically opposed ports extending rectilineally through its mating periphery, said ports being disposed to progressively cover and uncover said apertures of said inner body upon relative rotation of said bodies to selectively permit passage of a fluid through said bodies normal to the axis of rotation, said ports each having a housing thereover defining a passage leading to the port, and means for passing material to be separated by adsorption axially of the apparatus.

8. Apparatus for fluid flow control in chromatographic separation of materials, said apparatus comprising a pair of close-fitting cylinders, rotatable one within the other, the outer having diametrically opposed ports extending rectilineally therealong with respect to the major axis thereof, and the inner cylinder having opposed sets of apertures spirally disposed with respect to the axis thereof, the ports of said outer cylinder being selectively registrable with the apertures of said inner cylinder for passage of fluid in selected paths through said cylinder normal to the axis of rotation, said ports each having a housing thereover defining a passage leading to the port, and means for passing material to be separated by adsorption axially of the apparatus.

References Cited in the file of this patent

UNITED STATES PATENTS

| | | |
|---|---|---|
| 333,524 | Hunt | Jan. 5, 1886 |
| 2,070,395 | Easter | Feb. 9, 1937 |
| 2,189,594 | Schoenfeld | Feb. 6, 1940 |
| 2,342,380 | Storment | Feb. 22, 1944 |
| 2,347,829 | Karlsson et al. | May 2, 1944 |
| 2,447,423 | Nies | Aug. 17, 1948 |
| 2,484,942 | Guise | Oct. 18, 1949 |
| 2,487,574 | Meng | Nov. 8, 1949 |
| 2,558,861 | Liggett | July 3, 1951 |
| 2,617,986 | Miller | Nov. 11, 1952 |

FOREIGN PATENTS

| | | |
|---|---|---|
| 15,374 | Great Britain | of 1898 |